(12) United States Patent
Campbell

(10) Patent No.: US 6,657,755 B1
(45) Date of Patent: Dec. 2, 2003

(54) DIAGONALIZED IMAGE SENSOR PIXELS

(75) Inventor: Scott Patrick Campbell, Sunland, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/507,565

(22) Filed: Feb. 18, 2000

Related U.S. Application Data

(60) Provisional application No. 60/120,805, filed on Feb. 19, 1999.

(51) Int. Cl.[7] ............................. H04N 1/46; H04N 3/14
(52) U.S. Cl. ...................... 358/514; 358/512; 358/513; 348/272; 348/273; 348/275
(58) Field of Search .................... 358/514, 512, 358/513; 348/272, 275, 273

(56) References Cited

U.S. PATENT DOCUMENTS

| | | | | | |
|---|---|---|---|---|---|
| 5,280,347 | A | * | 1/1994 | Shiraishi et al. | 348/223.1 |
| 6,134,347 | A | * | 10/2000 | Niwamoto | 382/166 |
| 6,249,643 | B1 | * | 6/2001 | Mimura | 386/107 |

* cited by examiner

*Primary Examiner*—Edward Coles
*Assistant Examiner*—Houshang Safaipour
(74) *Attorney, Agent, or Firm*—Dickstein Shapiro Morin & Oshinsky LLP

(57) ABSTRACT

Pixels in an image sensor array are arranged at an angle of 45 degrees relative to the axis of the array and read out in a zigzag fashion.

9 Claims, 2 Drawing Sheets

|   |   |   |   |
|---|---|---|---|
| G | R | G | R |
| B | G | B | G |
| G | R | G | R |
| B | G | B | G |

FIG. 1(c)

DIAGONALIZED IMAGE SENSOR PIXELS

The present application claims priority under 35 USC 119 from Provisional Application No. 60/120,805, filed Feb. 19, 1999.

BACKGROUND

Image sensors are often arranged into an array of pixels. Each pixel forms a picture element of the scene being processed. It is often desired to obtain improved resolution and/or improved sensitivity of such sensors. These parameters, however, are often limited by the budget for the project.

SUMMARY

The present application teaches a diagonally disposed array of image sensor pixels.

BRIEF DESCRIPTION OF THE DRAWINGS

FIG. 1C shows a color filter array layout; and

FIG. 2 shows an image of a star-pattern chart, demonstrating axial and diagonal aliasing.

DETAILED DESCRIPTION

The present application describes an image plane sensor whose pixels are oriented along diagonals. The diagonals can be, for example, at 45° to the horizontal or vertical axes of the sensor array. This geometry can increase the axial (horizontal and vertical) resolutions of the system by $\sqrt{2}$ each over that achieved using axially-aligned pixels as in conventional sensor arrays.

In prior art, axial (horizontal and vertical) resolution is limited to the scale of the pixels' width and height. Due to intra-line sampling, this forms a high resolution axis along the sensor array's diagonals. The inventors recognized that this axis encompasses minimal image structure. The vertical and horizontal axial axes are actually where most of the image structure exists.

According to the present application, the overall image sensor remains oriented at 0 or 90°, but the pixel orientation is rotated by 45° relative to the sensor array structure.

Figure 1A:
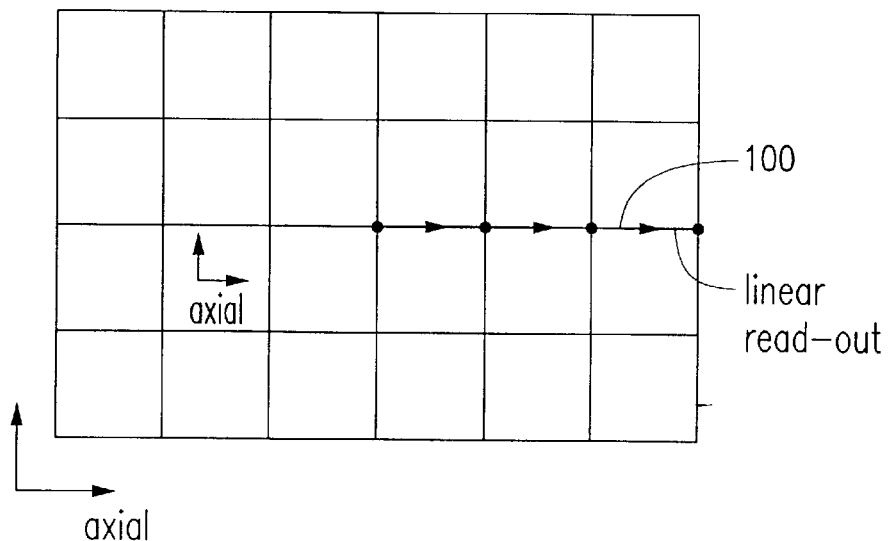
FIG. 1A shows a prior art system having a horizontal axis sensor.

FIG. 1A shows the prior art system in which the pixels are oriented axially (along the sensor array's horizontal and vertical axes). Linear readout is carried out as shown in element 100 of FIG. 1A.

Figure 1B:
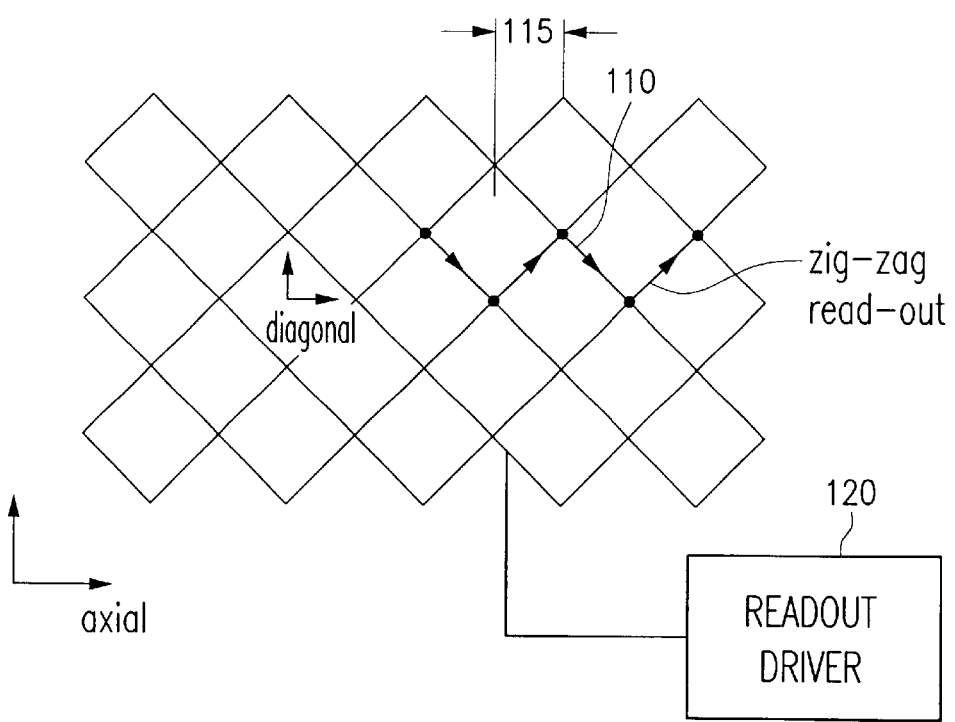
FIG. 1B shows a pixel layout of a preferred element.

The present application is shown in FIG. 1B. In this system, the structure is read out in its diagonal direction. Effectively, the pixels are read out in a zigzag, shown as 110. FIG. 1B shows readout drive 120, which controls read out in the zigzag direction, first in a generally upward direction, and next in a more downward direction. This can be a device selecting one pixel after another, in this general arrangement.

Importantly, the axial distance between sampling points in FIG. 1B is equal to half the pixels' axial dimensions, shown as 115. For pixels of identical dimensions, the diagonal sampling interval is equal to $\sqrt{2}$ of its axial sampling interval.

Figure 1C:
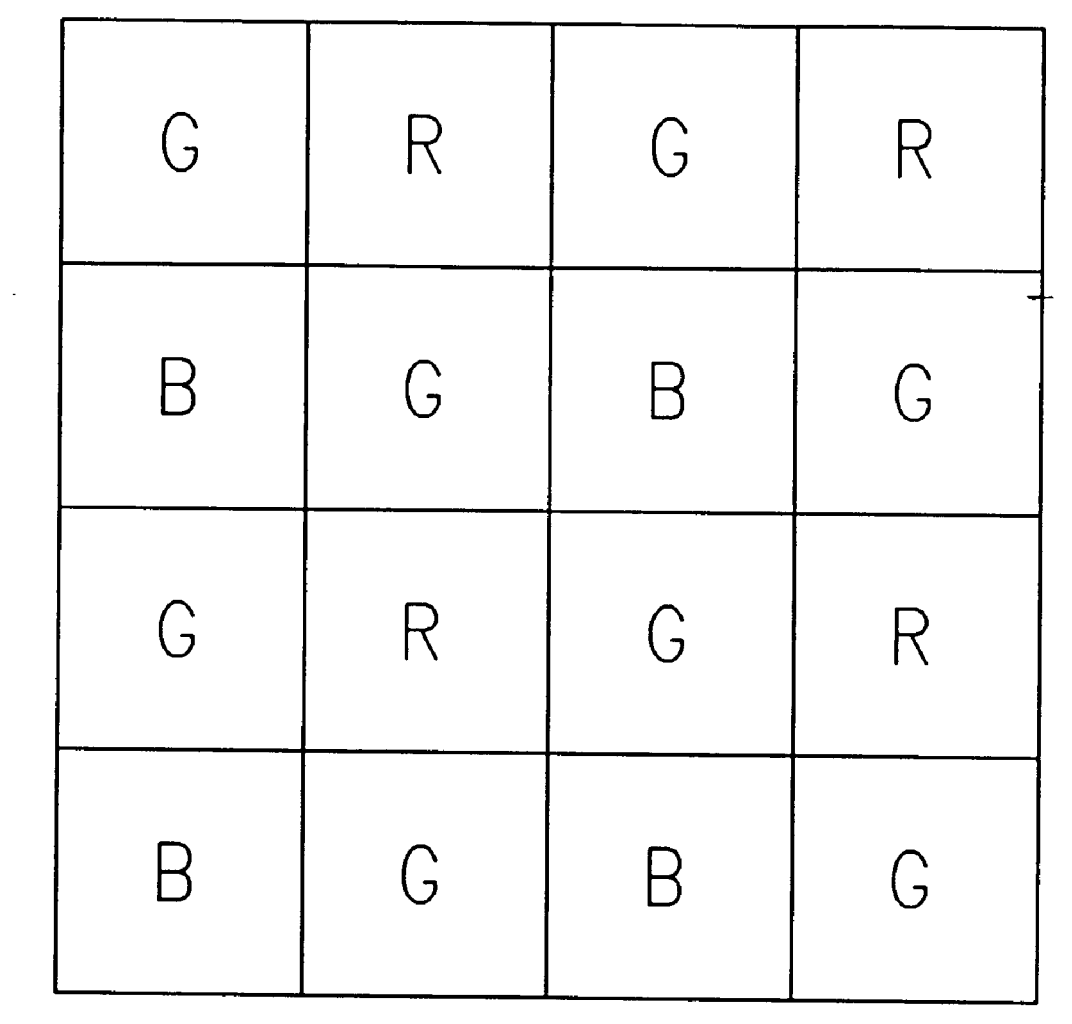

A diagonal color image sensor 150 is formed as shown in FIG. 1C, with the conventional Bayer pattern color filter array. At the Nyquist frequency for the pixels' axial axes, the image appears to be either aqua (whereby half of the green and all of the blue pixels obtain light while half of the green and all of the red pixels are dark) or orange (whereby half of the green and all of the red pixels obtain light while half of the green and all of the blue pixels are dark). Alternatively, at the Nyquist frequency for the pixels' diagonal axes, the image either appears green (where all of the green pixels obtain light and all of the blue and all of the red pixels are dark) or magenta (whereby all of the blue and all of the red pixels obtain light and all of the green pixels are dark).

FIG. 2 shows that the diagonal axes of the image sensor have a Nyquist frequency $\sqrt{2}$ higher than that of the axial axes. The (colorful) aliasing flares demonstrate this phenomenon. The test chart's line dimensions along the diagonal flares are $\sqrt{2}$ smaller than their dimensions along the axial flares.

This system provides significant advantages described herein. The primary advantage is that resolution can increase along certain axes by a factor of $\sqrt{2}$. This gain in resolution along one set of axes is always at the expense of resolution along axes at 45 degrees to that first axis set. This advantage can be used to selectively place the higher resolution sensor array axes along the higher information content image axes. In this manner, an effective factor of $\sqrt{2} \times \sqrt{2} = 2$ increase in sensor array pixel count can be simulated simply by orienting a fixed number of sensor array pixels diagonally. Alternatively, the total pixel count can be decreased by a factor of two when diagonalized pixels are used to achieve a fixed effective pixel count. This reduction in pixel count can then be used to increase data throughput rates without the loss of image information content. It can also be used to reduce the area of the sensor array, thereby reducing size and cost of the camera system. Alternatively, when a sensor array's pixels are diagonalized and the pixel count is reduced by a factor of two, the overall sensor array size can be kept constant if the pixels are made a factor of two larger in area. This increase in pixel area translates directly into a factor of two increase in pixel sensitivity to light.

Trade-offs can be made among the above for advantages such that the product of the (Improved resolution)*(Improved sensitivity)*(Improved rates)*(Improved reciprocal array area) is less than or equal to 4. This relation can be quantified by a figure of merit, or merit function, M. Increased pixel area, a, provides proportionally increased sensitivity. Hence, the merit function should be directly proportional to the actual pixel area, $a_a$. Decreased actual pixel count, $p_a$, provides proportionally-decreased actual readout times. The merit function should be inversely proportional to the actual pixel count. Increased effective pixel count, $p_e$, provides proportionally increased effective resolution, the merit function should be directly proportional to the effective pixel count. Decreased actual sensor area, $A_a$, provides proportionally decreased chip size, the merit function should be inversely proportional to the actual sensor area. This diagonal-axial merit function is then normalized to the axial-axial merit function. In the terms of the statements above, the effective (diagonal-axial) merit function, $M_d$, is given as $$M_d = \frac{a_a p_e}{A_a p_a} = \frac{p_e}{p_a p_a} = \frac{p_e}{(p_a)^2} = \frac{2}{p_a}$$

where $a_a$ is the actual pixel area, $p_e$ is the effective pixel count, $A_a$ is the actual array area, and $p_a$ is the actual pixel count. Note that the final step results from $p_e$ in a diagonal-axial array always equaling $2p_a$ in a diagonal-axial array. Similarly, the original (axial-axial) merit function, $M_a$, will be $$M_a = \frac{a_a p_a}{A_a p_a} = \frac{a_0 p_0}{A_0 p_0} = \frac{a_0}{A_0} = \frac{1}{p_0}$$

where $a_0$ is the original pixel area, $p_0$ is the original pixel count, and $A_0$ is the original array area. Taking the ratio of these two functions then gives the normalized merit function, M, as $$M = \frac{M_d}{M_a} = \frac{2p_0}{p_a}$$

This merit function allows for a rapid analysis of improved effective performance of a sensor array that utilizes diagonal pixels rather than axial pixels. For example, doubling the effective pixel count (relative to the original pixel count) while keeping the number of actual pixels equal to the number of original pixels produces M=2. Alternatively, halving the actual number of pixels while keeping the effective pixel count equal to the original pixel count produces M=4. Furthermore, increasing the actual array area to 3/2 the original array area while increasing the actual pixel area to twice the original pixel area reduces the actual pixel count to 3/4 the original pixel count, thereby producing M=8/3. M will always range from one through four when at least one of the four parameters discussed above remains constant.

Other embodiments are contemplated. For example, while the present application discusses these items in terms of 45° diagonals, other orientations of diagonals may be useful for limited purposes. By changing the angle of acquisition, the effective high resolution axis can also be altered in order to match that high resolution axis with the high resolution axis of the scene being imaged.

What is claimed is:

1. A method for designing a diagonalized image sensor device comprising:

selecting an actual pixel count of diagonalized pixels;

selecting a pixel configuration including actual pixel shape, actual pixel dimensions and actual pixel orientation;

calculating actual pixel area based on actual pixel shape, actual pixel dimensions and actual pixel orientation;

calculating actual array area based on actual pixel count and actual pixel dimensions;

calculating effective pixel count based on actual pixel count, actual pixel dimensions and pixel orientation; and calculating a figure of effective merit $M_d$ as:

$$M_d = \frac{a_a p_e}{A_a P_a}$$

where $a_a$ is the actual pixel area $p_e$ is the effective pixel count, $A_a$ is the actual array area and pa is the actual pixel count.

2. A method for designing a diagonalized image sensor device comprising:

selecting an actual pixel count of diagonalized pixels;

selecting an original pixel count;

selecting a pixel configuration including actual pixel shape, actual pixel dimensions and actual pixel orientation;

calculating actual pixel area based on actual pixel shape, actual pixel dimensions and actual pixel orientation;

calculating actual array area based on actual pixel count and actual pixel dimensions;

calculating effective pixel count based on actual pixel count, actual pixel dimensions and pixel orientation;

calculating original pixel area based on pixel shape, actual pixel dimensions and a default pixel orientation;

calculating original array area based on original pixel area and original pixel count; and calculating a normalized figure of merit M as:

$$M = \frac{a_a p_e A_0 p_0}{A_a P_a a_0 p_0}$$

where $a_a$ is the actual pixel area $p_e$ is the effective pixel count, $A_a$ is the actual array area, pa is the actual pixel count, $a_0$ is the original pixel area, $p_0$ is the original pixel count and $A_0$ is the original array area.

3. A method for designing a diagonalized image sensor device as defined in claim 2 further comprising:

defining a pixel layout wherein an axis between two adjacent pixels has an axial direction that is neither horizontal nor vertical.

4. A method for designing a diagonalized image sensor device as defined in claim 3 wherein said axial direction is arranged at a 45° angle to the horizontal.

5. A method for designing a diagonalized image sensor device as defined in claim 3 further comprising:

designing a readout pattern which reads out along said axial direction in a zigzag direction, which reads first upward and then downward.

6. A method for designing a diagonalized image sensor device as defined in claim 5, further comprising:

designing a readout circuit which reads out said information in said readout pattern.

7. A method for designing a diagonalized image sensor device as defined in claim 3 further comprising:

designing an array of color filters associated with said pixels.

8. A method for designing a diagonalized image sensor device as defined in claim 7, wherein said array of color filters is a Bayer array.

9. A method for forming a diagonalized image sensor device comprising:

selecting an actual pixel count of diagonalized pixels;

selecting an original pixel count;

selecting a pixel configuration including actual pixel shape, actual pixel dimensions and actual pixel orientation;

calculating actual pixel area based on actual pixel shape, actual pixel dimensions and actual pixel orientation;

calculating actual array area based on actual pixel count and actual pixel dimensions;

calculating effective pixel count based on actual pixel count, actual pixel dimensions and pixel orientation;

calculating original pixel area based on pixel shape, actual pixel dimensions and a default pixel orientation;

calculating original array area based on original pixel area and original pixel count; and calculating a normalized figure of merit M as:

$$M = \frac{a_a p_e A_0 p_0}{A_a P_a a_0 p_0}$$

where $a_a$ is the actual pixel area $p_e$ is the effective pixel count, $A_a$ is the actual array area, pa is the actual pixel count, $a_0$ is the original pixel area, $p_0$ is the original pixel count and $A_0$ is the original array area;

adjusting one or more of said actual pixel area, said effective pixel count, said actual array area, said actual pixel count, said original pixel area, said original pixel count and said original array area; and forming a plurality of pixels on a substrate in a diagonalized arrangement according to said one or more adjusted actual pixel area, effective pixel count, actual array area, actual pixel count, original pixel area, original pixel count and original array area.

* * * * *